United States Patent Office 3,499,319
Patented Mar. 10, 1970

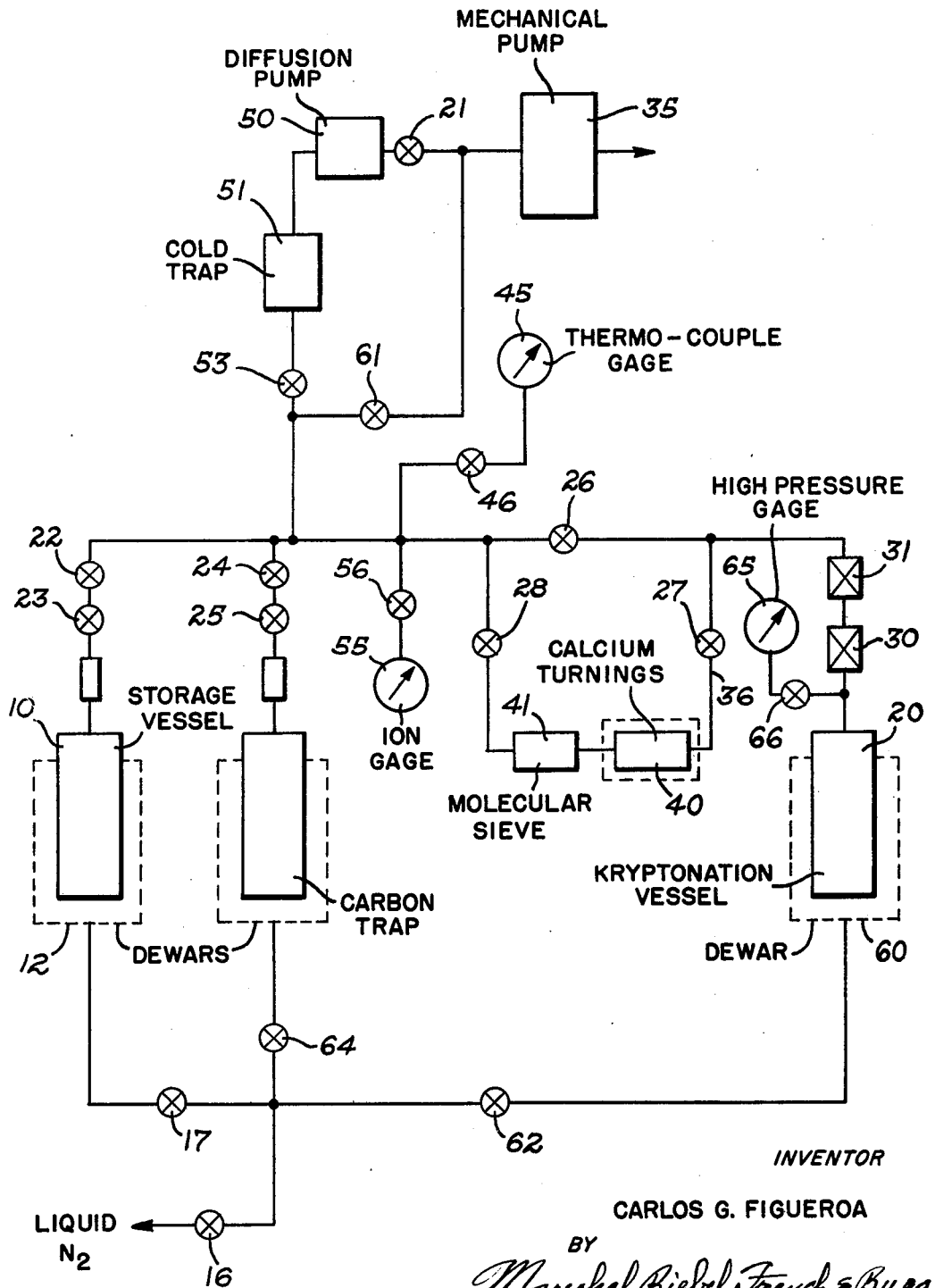

3,499,319
FATIGUE DETERMINATION BY RADIOACTIVE GAS
Carlos G. Figueroa, Columbus, Ohio, assignor to Industrial Nucleonics Corporation, a corporation of Ohio
Filed Jan. 13, 1967, Ser. No. 609,226
Int. Cl. G01b 5/30
U.S. Cl. 73—88     18 Claims

ABSTRACT OF THE DISCLOSURE

Incipient fatigue, prior to failure, as a function of changes in crystal structure is determined by incorporating a radioisotope of an inert, rare gas interstitially into the part being tested before or after application of load thereto. Changes in residual radioactivity or increased absorption indicate changes in crystal structure and identify areas of incipient fatigue prior to failure of the part.

FIELD OF INVENTION

This invention relates to a method of determining fatigue in a part and more particularly to an improved method for the dynamic measurement of incipient fatigue.

DESCRIPTION OF THE PRIOR ART

Presently, a convenient measurable parameter of metal fatigue is structural failure of the part being measured. This is generally accomplished by the evolution of an S/N curve in which stress in Newton's m.$^2$ or dynes/cm.$^2$ is plotted against the number of cycles required to induce failure at a given stress level. The procedure is varied for different stress levels until the endurance limit for the structure is found, the endurance limit being defined as the maximum stress level at which the part will not fail with an infinite number of cycles. The generation of an S/N curve is a destruction test, and fatigue is observed as microcracks or macrocracks by use of a magnetic field or a fluorescent dye.

Other methods which have been used include radioisotopes which are forced into cracks and detected, as described in British Patent 944,402 of 1963. The radioisotopes are materials such as iodine-131, cesium-137, cobalt-59 and cobalt-60. This procedure, however, suffers from the same disadvantage of those previously described in that it depends on a structural failure of micro or macro size. Another proposed approach to the measurement of changes in materials such as wear, has been to incorporate an inert, radioisotope gas into the material and measure at some remote point the release of the gas due to temperature or other changes (see for example pending U.S. application 571,120, filed Aug. 8, 1966, by the assignee of the present application).

TECHNICAL BACKGROUND OF THE INVENTION

It is known through the statistical relationships of stress and fatigue that even though the stress is kept below the elastic limit, a repetitive application of the loading may induce failure. This is to be distinguished from the application of a single stressing load within the elastic limit. Fractures apparently begin with small cracks which spread progressively on account of the greater stress at the base of the crack. Such failures have been called "fatigue failures" and "progressive failures." Undoubtedly at some early stage of this so-called progressive failure, the macrostructural crack has evolved from a microstructural condition. This microstructural condition may be related ultimately to defects of the material crystalline structure. By defects of the crystal structure are meant all kinds of disturbances to the periodic structure of the lattice.

It is known that different lattice defects, for example, vacancies, dislocated dislocation atoms, impurities, etc., play an important role in various physical processes that occur in metals and alloys. In recent years, there has been considerable development in ideas concerning the nature of different defects of the crystal lattice.

In real solids, the arrangement of the atoms in the lattice has an imperfect character. The presence of various kinds of imperfections influences the character of the physical processes which occur in solids, and can radically change their properties, which in such a case are called structure-sensitive.

The structural imperfections or distortions of the atomic type are vacancies, dislocated atoms and dislocations. These lattic defects interact with one another, causing observable effects in metals. It is believed that there are two methods wherein vacancies may be formed in the lattice of a crystal as a result of thermal motion of the ions. One is connected with independent formation of vacancies by diffusion of "atoms of emptiness" inside the crystal. The other method is connected with the transfer of the atom from the site to the interstice. The latter has a low probability as a consequence of the high energy necessary to form the dislocated atoms. Dislocations are defects or more complicated type than vacancies or dislocated atoms. The important characteristics of dislocation defects is that as they move along the structure under the influence of very small stresses, they excite formation of defects of the vacancy type or of the dislocated atom type, which is a consequence of the high local temperature that develops during the time of motion of the individual dislocation lines. Vacancy defects also may arise as a result of interaction and partial annihilation of dislocations. Stress dislocations have been described as sources or sinks for vacancies and interstitial atoms.

Slippage in crystal structure as a result of motion of dislocations along the glide planes presupposes that in the material there should exist dislocation sources. In a metal subjected to the action of stresses, these sources can form a sequential series of dislocations.

It has been proposed that a definite dislocation structure leads in a stressed material to the formation of new dislocations. In an annealed material, there exists a spatial grid-like structure of dislocations with density of $N_d$ per square centimeter. Each element of this structure can act in principle as a "Frank-Read" source. Of importance are only those elements which are favorably oriented relative to the applied stress and are capable of becoming activated at a length, 1, of the dislocation line. The critical shear stress necessary for activation of the source is given by the formula:

$$Fcr = I\frac{Gd}{1}$$

where

G = shear modulus
d = Burgers vector
I = a quantity (approx. 1) depending on the elastic constants of the material.

From the above discussion, it is apparent that stresses applied to a structure will result in atomic imperfections or defects capable of modifying the material functional characteristics.

Several investigations indicate that the phenomenon of failure of metals is a process that develops continuously in time and arises because the regularity of the crystal structure becomes destroyed during the course of time in some zone which can be called the "failure zone." The growth of destruction in the regularity of the crystal structure begins from the first instant that the stress is applied, but manifests itself most essentially only at a certain deformation stage preceding the failure. Direct observations indicate that in this stage one observes internal defects (pores, intercrystalline cracks), which do not exist prior to the test and which develop in time under the influence of the stress and of the temperature.

The most probably "failure zone" at high temperatures are the boundaries between the crystallites. These same boundaries also have an increased vacancy concentration. It has been postulated that the physical state of the "failure zone" is similar in many respects to the "liquid" state, that is, that at the instant preceding the failure, the degree of short-range order in the "failure zone" approaches the degree of order which would exist in the given metal during melting. The significance of this is the fact that prior to melting, the regularity of the crystal is greatly disturbed and the crystal lattice loses its stability with a great concentration of vacancies and dislocations surrounding the "melting foci." The vacancies can assume in a considerable degree the role of "microcracks," around which there are concentrated the stresses that cause local shears under the influence of the applied forces.

An investigation of brittle failure of metals has lead to the conclusion that most metals fail at low temperatures after an obligatory plastic deformation. It is assumed that the plastic deformation connected with the formation and motion of dislocations leads to the formation of microscopic and submicroscopic cracks, capable of growing as a result of stress concentration, until the metal fails. It can be assumed that in order for microcracks to be formed in the boundary zone, it is necessary to produce there a vacancy concentration such as would correspond to the melting temperatures.

It is also known that the radioisotope krypton-85, an inert gas, may be incorporated into the crystal lattice of a host material without affecting the physical or chemical properties of the host material. This is also true of the radioisotope argon-42, likewise an inert gas. Of the two, krypton-85 has been used more widely because of its availability. Krypton-85 has several desirable properties apart from its inertness, including a half-life of 10.6 years and the fact that it is a beta emitter (662 kev.) and a gamma emitter (517 kev.) in the approximate ratio of 46 gammas for each thousand betas. Also, the atomic radius is relatively small, e.g. 3–4 A., and thus the atoms of krypton-85 are able to penetrate interstitially into the lattice of a host material.

Incorporation of krypton-85 into a host material has been carried out by two different methods. In one method, krypton atoms are ionized and drawn to the host material by applying a potential drop across the ion source and the host material. In the second method, the host material is impregnated by diffusing the atoms into the host material by use of high pressure and temperature.

In the latter method, the amount of krypton-85 retained in the host material is proportional to the pressure, the square root of time of exposure, and an exponential function of the pressure.

Argon-42 may also be incorporated into a host material by the same methods and is useful because it has a half-life of 5.2 years, and is a "hard" gamma emitter, i.e., 1.52 mev. Regardless of the inert gas used, or the method by which it is diffused into the lattice of the host material, the process will be hereinafter referred to as "kryptonating" and the resultant part will be identified as a kryptonated material.

SUMMARY OF THE INVENTION

By the present invention, a dynamic method for the measurement of incipient fatigue is possible by detecting the inert radioisotope change in the host material. The amount of an inert radioisotope in the host material is a function of the change in defects in the crystal structure attributable to the application of a static or dynamic load. Thus, a host material is impregnated with an inert, gaseous radioisotope which does not affect the strength or crystal structure of the host material. The host material is then exposed to a fatigue inducting stress either before or after impregnation and the change in retention or absorption is measured by detecting the interstitially retained radioactive isotope. In the case where impregnation precedes application of a fatigue inducing stress, the residual radioactivity is reduced in those areas of incipient fatigue. Conversely, where the host material is subjected to a fatigue inducing stress and thereafter impregnated, the absorbed radioactive gas is increased, as indicated by greater radioactivity, in those areas of incipient fatigue.

Accordingly, a primary object of the present invention is the provision of an improved method for detecting incipient fatigue in a part subjected to a fatigue inducing stress without destroying the part during the test.

Another object of the present invention is the provision of an improved method for the dynamic measurement of fatigue of a part prior to failure thereof by incorporating a radioisotope of an inert gas interstitially within the crystal lattice structure of the part being tested, and detecting the areas of incipient fatigue by measuring the retained or absorbed radiation as a function of change in crystal structure defects resulting from the application of a fatigue inducing stress.

Other objects and advantages of the invention will be apparent from the following description, the accompanying drawing and the appended claims.

The drawing schematically shows an apparatus used for diffusion of a radioactive inert gas into the lattice structure of a host material.

DESCRIPTION OF THE INVENTION

The host material to be fatigue tested in accordance with the present invention may be kryptonated before or after application of a fatigue inducing stress as follows. The parts to be kryptonated are cleaned by applying to their surface a low vapor pressure cleansing solution which removes any oil film and dirt. If desired, the parts may thereafter be rinsed in water, or a water detergent mixture and rinsed in clear water.

Referring to FIG. 1, a system is shown for kryptonating parts and includes a storage vessel 10 containing the inert gas radioisotope such as krypton-85 or argon-42. The gas is maintained in a liquid state by immersing it in a Dewar flask 12 supplied with liquid nitrogen from a source (not shown) through valves 16 and 17. The part to be kryptonated is placed in a kryptonation vessel 20 which is constructed to withstand high vacuum, high pressures, and high temperature. The first step in the procedure is to degas the part by applying a vacuum to the system. This is accomplished by closing valves 21, 22, 23, 24, 25, 26 and 53, while opening valves 27 and 28, 46, 56, 61 and 68, all of which are bellows sealed valves. High pressure-high temperature valves 30 and 31 are also opened and an initial vacuum is pulled by a mechanical pump 35. Outgassed impurities are pulled through valves 30 and 31 into conduit 36, through valve 27 and into series filters 40 and 41, the former being filled with calcium turnings to collect oxygen, and the latter being molecular sieve for water and CO and $CO_2$ and other materials. The mechanical pump is capable of providing a vacuum of about $10^{-1}$ to $10^{-2}$ mm. of Hg, and the pressure in the system is monitored by a thermocouple gage 45 connected into the lines by valve 46, and which is capable of providing pressure readings in the range of 20 mm. to 10 microns of Hg. For lower pressures, e.g. 200 microns, a diffusion pump 50 is provided which is protected by a cold trap 51, and in series with valve 53. Valve 61 is closed and valves 53 and 21 opened. An ion gage 55 accurate between 10 microns and $10^{-7}$ microns of Hg is connected into the line through valve 56 for monitoring pressures at the lower values.

Once the part is outgassed and the proper low level of presure achieved, e.g. 10⁻³ mm. Hg, a Dewar flask 60 is placed under kryptonation vessel 20 and the radioactive gaseous isotope is cryogenically pumped from the storage vessel 10 into the vessel 20. This is accomplished by closing off valves 53, 61, 24, 25, 27 and 28 and by opening valves 22, 23, 26, 30 and 31. Liquid nitrogen is then introduced into flask 60 by opening valves 16 and 62 while 17 and 64 are closed thereby bringing the vessel 20 to liquid nitrogen temperature which creates a pressure differential between the vessel 20 and the storage vessel 10 that pumps the gas from one to the other. Valves 30 and 31 are then closed and Dewar flask 60 is removed from vessel 20.

A furnace is then placed around the vessel 20 to obtain a predetermined temperature in the range of 500° F. to 2000° F. and the pressure within vessel 20 rises and can be monitored by high pressure gage 65 connected into the system by valve 66. The increase in pressure follows the Gas Law relationship and the resulting pressure in the vessel 20, as a function of a given temperature, will be determined by the free air volume in the vessel. The part is then exposed to elevated temperature and pressure in an atmosphere of radioactive gas for the required period of time, which may be as long as several days.

After kryptonation, the furnace is removed from the vessel 20, and the storage vessel Dewar 12 is filled with liquid nitrogen, and by opening valves 30 and 31, the gas in vessel 20 is cryogenically pumped back to storage vessel 10. In order to keep the system free of contaminants such as oxygen, carbon monoxide, carbon dioxide, and water, the gas is flowed through filters 40 and 41 during the return pumping operation by closing valve 26 and opening 27 and 28. After pumping is finished, there still will be some gas in the system because of the partial pressure of the gas, e.g. 4 mm. of Hg in the case of krypton. Thus, by opening valves 24 and 25 and maintaining an activated carbon trap 70 at liquid nitrogen temperatures, a substantial amount of the remaining gas is absorbed, until the pressure is down to 10⁻³ mm. Hg in the case of krypton. The remaining gas may be pumped out of the system, and the samples removed from the kryptonating vessel 20.

Since some of the inert gas atoms will be adsorbed on the surface, it is desirable to remove them by normal cleaning procedures, and if desired, the host material may be heated slightly.

The amount of gas absorbed interstitially into the crystal lattice structure or between the crystals of a host material is proportional to the pressure, proportional to the square root of time and an exponential function of temperature. Thus, the amount of gas absorbed can be varied by varying the temperature and pressure during the kryptonating process.

In accordance with the present invention, it is preferred that the host material be impregnated to a depth of between 1 to 100 microns, and possess a specific activity of between 1 and 10 micro curies per square centimeter. Virtually any material can be kryptonated, but the depth of penetration and the specific activity is a function of crystal structure and density of the host material. Various metals have been kryptonated including Inconel-713C, Hastelloy X, various aluminum alloys as well as plastics. Phenolic resins exhibit a particularly high level of absorption of inert gases such as krypton-85 and argon-42 radioisotopes.

Incipient fatigue may be determined by any one of several methods in accordance with the present invention. The first method involves kryptonating a host material as previously described and subjecting it to a fatigue inducing stress, for example, by a Krouse Axial Loading Machine.

Following the application of fatigue inducing load, the host material is analyzed radiometrically by the use of a beta gage detector, or radiation sensitive film, to determine the change in the retained krypton-85 as a function of incipient fatigue. The host material can be scanned by moving a beta gauge thereacross to detect differences in radiation level. Those areas which are fatigued will exhibit a lower beta emission as a result of the reduced amount of krypton-85 because of changes in the crystal structure of the host material. The detection of these areas is very useful when manufacturing parts requiring high structural integrity. The change in the retained krypton-85 can be correlated with the amount of fatigue to evaluate the degree of incipient fatigue. During application of the fatigue inducing load, the environmental temperature of the host material should be fairly constant. Thereby, room temperature changes will not affect the amount of radiation remaining. A manual or automatic temperature control can be used to maintain the host material temperature substantially constant during loading and until radiometric analysis is completed. The samples are periodically evaluated radiographically, for example, by beta detection, to determine the amount of krypton or argon radioisotope retained.

If the host material temperature is not maintained substantially constant during application of the fatigue inducing load and thereafter, until radiometric analysis is completed, an increase in the environmental temperature may result in the loss of a fraction of radioactive material as a function of the temperature, the loss due to the increase in environmental temperature can be considered in connection with the loss due to incipient fatiguing, to maintain correlation between degree of fatigue and the remaining inert radioisotope gas. Alternatively, the application of the fatigue inducing stress and the subsequent period until radiometric analysis is completed can be at a temperature no greater than the temperature used as the reference for correlation measurements to maintain the calibration of remaining radioisotope with degree of fatigue.

It is also desirable in accordance with the present invention to temperature relieve the part prior to application of a fatigue inducing stress by elevating it to a predetermined temperature above its normal operating temperature to prevent radioisotope loss due to increase in temperature rather than incipient fatigue. Another way in which this may be accomplished is to relieve the part at its working temperature by actually working the part in its operational environment. Either procedure results in temperature relieving the part at a predetermined temperature which is the actual operating temperature of the part or a temperature somewhat higher.

Another procedure by which incipient fatigue may be determined is to subject the host material to a fatigue inducing stress followed by kryptonation as previously described under conditions which will not modify the fatigued condition, i.e., below the annealing temperature of the metal. Incipient fatigue is indicated by the increased absorption of krypton-85 or argon-42 as a function of change in crystal lattice structure attributable to the application of a load.

The last-described procedure was utilized by fatiguing aluminum bars to which a fatigue inducing stress was applied by cyclic end loading techniques. One set of bars was fatigued in this manner and the other set was used as a comparison standard bar. The kryptonating temperature for both sets of bars was about 500° F. to prevent annealing and any modification of the fatigue state. After kryptonation, the test bars were examined for radioactivity. The nonfatigued sample showed 8 to 10% activity remaining after the samples were heated to 500° F. for about thirty minutes while the fatigued parts showed as much as 18% activity remaining after heating at the same temperature for approximately the same time.

In the procedure where the fatigue inducing stress precedes the kryptonating step, the environmental temperature of the host material should not exceed the temperature used as the reference for correlation measurements, to maintain the calibration of remaining radioisotope with degree of fatigue. Alternatively, the environmental temperature of the kryptonated host material can be maintained fairly constant, so that room temperature changes will not affect the amount of radiation remaining. A manual or automatic temperature control can be used to maintain the host material temperature substantially constant after kryptonating and until the radiometric analysis is completed. If the host material temperature is not maintained substantially constant after kryptonation and until radiometric analysis is completed, an increase in the environmental temperature may result in the loss of a fraction of radioactive material as a function of the temperature. The loss due to the increase in environmental temperature can be considered in connection with the loss due to incipient fatiguing, to maintain correlation between degree of fatigue and the remaining inert radioisotope gas.

Another method for determining incipient fatigue in accordance with the present invention is a combination of both of the previous procedures in which the host material is subjected to a fatigue inducing stress prior to kryptonation. After kryptonation, the host material is subjected to an elevated temperature below the annealing temperature, and the amount of radioactivity is indicative of incipient fatiguing. The same guidelines and alternative temperature operating arrangements apply here as stated for the previously described procedure of inducing the fatigue followed by kryptonation and radiometric analysis.

In still another procedure, the fatigue inducing stress is applied until a microcrack is produced which results in an increased concentration of radioactivity essentially along the edges of the crack. The part can be kryptonated and then stressed, or stressed and then kryptonated. These cracks are then located by autoradiography, that is, use of a film which is sensitive to beta rays, or by radiation detection techniques in which a beta detector and pulse counter or integrator are used.

Incipient fatigue induced by temperature cycling was also studied by kryptonating two specimens of Inconel-713C metal and mounting thermocouples on each specimen for monitoring the temperature at spaced points, the points being selected such that there was 100° F. differential between them. The heat exposure of the two samples was cyclic but for different time periods. The first specimen was heated for thirty minutes and cooled for ten minutes while the other was heated for ninety seconds and cooled for sixty seconds. Both specimens were assayed for krypton-85 activity after every thirty minutes of total heating time. In the specimen heated 30 minutes and cooled for ten minutes, the higher temperature point had less retained Kr-85, as expected, since it was a function of total heating time when compared to the lower temperature point. In the specimen heated ninety seconds and cooled for sixty seconds, the higher temperature point had a higher retention of krypton-85 compared to the lower temperature point. The increased krypton-85 retention at the higher temperature indicated incipient fatigue attributable to a change in the crystal lattice structure due to a thermally induced stress.

In each of the above procedures the radioisotope of an inert gas was incorporated interstitially into the lattice of a host material either before or after application of a fatigue inducing stress. Since fatigue is primarily a surface phenomena, that is, the major effects of incipient fatigue start from the surface and progress inwardly towards the body of the material, the change in crystal lattice structure results in a difference in absorption characteristic or release characteristic of the radioisotope. The use of an inert gas according to the invention permits detection of the surface fatigue, since the depth of penetration of the gas into the material can be controlled. While localized heat may be a factor, it is the residual radioactivity which indicates the areas of stress when compared to the non-stressed areas of the host material. If a fatigue inducing stress is applied to a particular part, for example, a wing spar, or a gear, or a bearing, the structural fatigue can be plotted using generally the same technique used to derive S/N curves except that the part is not fatigued to failure, and the changes in retained or additionally absorbed radiation may be used to evolve a graph. In this way, the fatigue characteristic of any particular part may be studied, and later, an actual working part may be checked either by the absorption procedure previously described or the release procedure described and checked against the standard curve. Thus, it is possible to predict when actual fatigue as opposed to incipient fatigue will occur by monitoring the changes in the crystal structure as a function in the change in radioactivity. If incipient fatiguing has occurred significantly, the original crystal structure may be regenerated by re-annealing the part, or the part may be replaced prior to actual failure.

While the methods therein described constitute preferred embodiments of the invention, it is to be understood that the invention is not limited to these precise methods, and that changes may be made therein without departing from the scope of the invention which is defined in the appended claims.

What is claimed is:
1. A method for the dynamic measurement of fatigue of a part prior to failure as the result of load comprising the steps of:
  applying said load to stress said part for inducing incipient fatigue by producing a lattice defect in the crystal structure,
  incorporating an inert radioactive gas interstitially within the lattice of said part, and
  detecting the interstitially retained radioactive gas to provide a measurement of the difference in radiation level in said part as a function of lattice defects resulting from the application of said load.

2. A method as set forth in claim 1 wherein said radioactive gas is incorporated prior to application of said load, and wherein the application of said load induces a lattice defect which releases at least a portion of the intertitially incorporated radioactive gas, and said detecting step measuring the reduction in radioactive level as a function of the induced lattice defect.

3. A method as set forth in claim 1 wherein said radioactive gas is incorporated subsequent to application of said load, and wherein said detecting step measures the increased radiation level as a function of the induced lattice defect.

4. A method as set forth in claim 1 wherein said radioactive gas is krypton-85 radioisotope.

5. A method as set forth in claim 1 wherein said radioactive gas is a beta emitter, and wherein said detecting step measures the beta radiation.

6. A method as set forth in claim 1 wherein said part is loaded to produce a microcrack, and wherein said microcrack is detected by increased concentration of radioactivity along the edges of the crack.

7. A method as set forth in claim 1 wherein said detection operation includes the step of scanning said part with a radiation meter sensitive to the emitted radiation.

8. A method as set forth in claim 2, wherein said part is temperature relieved prior to application of a fatigue inducing stress at a predetermined level, and wherein the amibent temperature of said part during loading and until the detection is completed is below said predetermined level.

9. A method as set forth in claim 2, wherein said part is at an environmental temperature after said incorporation and until said detection is completed, no greater than the reference temperature used for correlation of the radiation level with degree of fatigue.

10. A method as set forth in claim 2, wherein said inert radioactive material is krypton-85.

11. A method as set forth in claim 2, wherein said part is at a substantially constant temperature during loading and until the detection is completed.

12. A method as set forth in claim 3, wherein said part is at an environmental temperature, after incorporation and until said detection is completed, no greater than the reference temperature used for correlation of the radiation level with degree of fatigue.

13. A method as set forth in claim 3, wherein said part is at a substantially constant temperature after said incorporating and until detection is completed.

14. A method as set forth in claim 6, wherein said inert radioactive gas is incorporated interstitially prior to application of the load.

15. A method as set forth in claim 6 wherein said inert radioactive gas is incorporated interstitially after application of the load.

16. A method as set forth in claim 1 wherein said loading step occurs prior to said incorporating step, and after said incorporating step and before said detecting step, said host material is subjected to an elevated temperature below the annealing temperature.

17. A method as set forth in claim 16, wherein said part is at an environmental temperature, after said host material is subjected to said elevated temperature and until said detection is completed, no greater than the reference temperature used for correlation of the radiation level with degree of fatigue.

18. A method as set forth in claim 16, wherein said part is at a substantially constant temperature after said elevation and until said detection is completed.

References Cited

UNITED STATES PATENTS

| | | | |
|---|---|---|---|
| 2,938,125 | 5/1960 | Marak | 250—106 |
| 3,101,413 | 8/1963 | Schashl et al. | 250—106 |
| 3,128,381 | 4/1964 | Morley et al. | 250—106 |

RICHARD C. QUEISSER, Primary Examiner

CHARLES A. RUEHL, Assistant Examiner

U.S. Cl. X.R.

73—104; 250—106